(12) United States Patent
Nomoto

(10) Patent No.: US 6,205,847 B1
(45) Date of Patent: Mar. 27, 2001

(54) METHOD OF TESTING FOR A LEAK WITH THE INNER VESSEL OF A DOUBLE BLOW MOLDED BOTTLE

(75) Inventor: Tugio Nomoto, Tokyo (JP)

(73) Assignee: Yoshino Kogyosho Co., Ltd., Tokyo (JP)

( * ) Notice: Subject to any disclaimer, the term of this patent is extended or adjusted under 35 U.S.C. 154(b) by 0 days.

(21) Appl. No.: 09/242,906

(22) PCT Filed: Sep. 14, 1998

(86) PCT No.: PCT/JP98/04143

§ 371 Date: Apr. 22, 1999

§ 102(e) Date: Apr. 22, 1999

(87) PCT Pub. No.: WO99/14569

PCT Pub. Date: Mar. 25, 1999

(30) Foreign Application Priority Data

Sep. 17, 1997 (JP) .................................................. 9-251575
Sep. 3, 1998 (JP) ................................................. 10-249776

(51) Int. Cl.[7] .................................................. G01M 3/32
(52) U.S. Cl. .......................................... 73/49.2; 79/49.3
(58) Field of Search ....................................... 73/49.2, 49.3

(56) References Cited

U.S. PATENT DOCUMENTS 4,055,984 * 11/1977 Marx ...................................... 73/49.2

FOREIGN PATENT DOCUMENTS 63-35340 * 2/1989 (JP) ....................................... 73/49.2
10-156928 * 6/1998 (JP) ...................................... 215/12.1

* cited by examiner

Primary Examiner—Daniel S. Larkin
(74) Attorney, Agent, or Firm—Oliff & Berridge, PLC

(57) ABSTRACT

Double blow molded bottles of synthetic resins are given consistent quality by making it possible to detect the existence of a leak in the inner vessel in which to store the liquid contents. The bottles of consistent quality can be provided by a method of leak test, which includes forming an air channel between an outer vessel and an inner vessel by deflating and peeling the inner vessel from the outer vessel and by securing air flow through an opening of an air channel and judging the existence or non-existence of a leak through the wall of the inner vessel by supplying air to the inner vessel at a given micropressure and by observing, after a certain period of elapsed time, whether or not the pressure inside the inner vessel reaches the predetermined level which has been set from a test conducted under the same conditions using the bottles with no leak through the wall of the inner vessel.

4 Claims, 3 Drawing Sheets

METHOD OF TESTING FOR A LEAK WITH THE INNER VESSEL OF A DOUBLE BLOW MOLDED BOTTLE

TECHNICAL FIELD

This invention relates to a method of testing for a leak to check on whether there is a leak or not in the wall of the inner vessel of a double blow molded bottle made of a synthetic resin or resins, wherein said bottle is molded by laminating peelably the outer vessel comprising the outer shell of a fixed shape with the inner vessel comprising a deformable inner bag, so that liquid contents can be poured out without any change in outer appearance of the bottle and yet open air is prevented from invading the inner vessel of the bottle.

BACKGROUND OF THE INVENTION

A conventional method of testing for a leak with this type of double blow molded bottles involved testing the entire bottle for any leak, as by means of pressure measurement inside the bottle.

Because the aforementioned conventional leak testing method involves testing the entire double blow molded bottle for any leak, it was impossible to test these bottles for a leak unless each of the outer and inner vessels has a leak at the same position of the bottle. The leak test could not be conducted if the inner vessel alone had a leak.

SUMMARY OF THE INVENTION

This invention has been made to solve the aformentioned problems found in prior art. An object of this invention is to make it possible, technically, to detect any leak in the inner vessel of a double blow molded bottle, where the liquid contents are received. Another object of this invention is to supply users stably with the double blow molded bottles made of synthetic resins of consistent quality.

DETAILED DESCRIPTION OF THE INVENTION

In the invention there is provided a method of testing for a leak with the inner vessel of a double blow molded bottle, wherein said bottle comprises an outer vessel of a synthetic resin or resins forming the outer shell of a fixed shape and an inner vessel in the form of an inner bag of a flexible synthetic resin or resins, said inner vessel being peelably laminated inside the outer vessel, and wherein said bottle has an opening to enable the space between the outer and inner vessels to be exposed to the outside.

According to this invention, an air channel is formed between the outer and inner vessels by deflating and peeling the inner vessel from the outer vessel and by securing air flow through the opening of this air channel.

The existence or non-existence of a leak in the inner vessel is judged by supplying air to the inner vessel at a given micropressure and by observing, after a certain period of elapsed time, whether or not the pressure inside the inner vessel reaches a predetermined level which has been set from a test conducted under the same conditions using a bottle with no leak through the inner vessel wall.

When test air supplied to the inner vessel begins in its deflated state, the pressure inside the inner vessel reaches a set pressure level after a certain period of elapsed time, if the inner vessel has no leak.

In contrast, if the inner vessel has a leak, there inevitably follows a flow of test air through the leak. Even if the rate of air flow through the leak in unit time is lower than the test air supply rate and if it is possible for the pressure inside the inner vessel to reach the preset level, it takes a longer period of time to reach that level than the preset period. If the air leak rate is higher than the air supply rate, the pressure inside the inner vessel would never reach the preset pressure level.

Therefore, it is preferred to make measurements in advance on a relationship between the time of test air supplied and the pressure inside the inner vessel for the bottle with no leak in the inner vessel, and based on this relationship, to set certain period of time and the level of pressure. If the set pressure is reached within the set period, then the bottle is judged as having no leak. If the pressure is not reached, the bottle has a leak.

At that time, it is necessary to secure the air flow through the channel opening during the test. If the air channel is closed, the air existing in the space between the outer and inner vessels is not discharged outside, and the pressure inside the bottle (not inside the inner vessel) sharply rises, regardless of the existence of a leak through the inner vessel. As a result, the test becomes impossible.

These settings of time and pressure differ, depending on the bottle size and shape, the material of the inner vessel, the pressure of supplied air, and the like. Therefore, measurements are required for each type of bottle to be tested, to set optimum levels for respective bottles. Since test air is supplied at a micropressure, the difference in the pressure inside the inner vessel caused by the leakage can be readily observed as an obvious change.

As the criteria for time and pressure settings, it is preferred to select the stage in which the deflated inner vessel starts to swell. During this stage, the pressure inside the inner vessel having no leak undergoes a sharp change (a pressure rise) as test air is fed thereto.

In the invention, there is provided a specific structure in which the opening is put in the wall of the outer vessel.

The invention makes it possible to deflate and deform the inner vessel while securing an assembly of outer and inner vessels at the mouth portion of the bottle, without the use of any cap or other parts. The test procedure gets all the more simple.

In the invention, there is provided a laminated structure for at least one of the outer vessel and the inner vessel and the layer comprising the interface between this laminated vessel and the other vessel is given high peelability against the opposite layer.

When the inner vessel is peeled from the outer vessel, the invention makes it possible to obtain steady and smooth peeling movements of the inner vessel in a manner giving full play, without any difficulty, to the function required for the entire bottle or for each of the outer and inner vessels, by giving a laminated structure to the outer vessel and/or the inner vessel. With smooth peeling secured, the inner vessel can be stably deflated and deformed in a certain shape, and the leak test with the inner vessel can be conducted with increased precision.

BRIEF DESCRIPTION OF THE DRAWINGS

FIG. 1-*a* shows the normal state of the bottle; and FIG. 1-*b,* the bottle with the inner vessel in a deflated state.

DESCRIPTION OF THE PREFERRED EMBODIMENTS

Figure 1A:
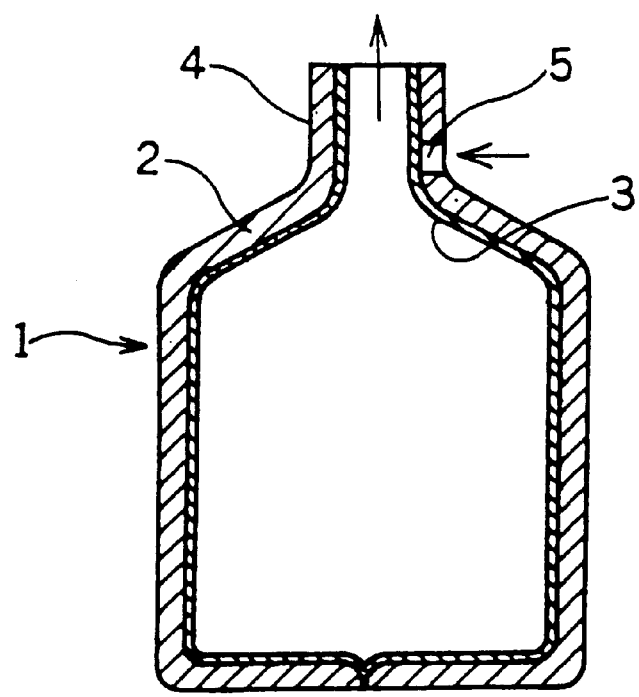
FIG. 1 is the vertical cross-sectional views showing the structure of the double blow molded bottle with which this invention is carried out.

This invention is further described, referring now to the drawings. The double blow molded bottle 1 was blow-molded from a parison which has been extrusion-molded into a laminated cylinder by coextruding the outer vessel 2 of a polyethylene resin or resins and the inner vessel 3 of nylon capable of readily peeling from a polyethylene resin layer.

An opening 5 is disposed in the mouth portion 4 of the outer vessel 2 of the bottle 1. Through this opening 5, air outside is allowed to enter the space between the outer vessel 2 and the inner vessel 3 as the liquid contained in the inner vessel 3 is poured out and the inner bag is deflated with the decrease in its contents. At that time, owing to the invasion of air from outside, the inner vessel 3 can be smoothly peeled from the outer vessel 2 and deformed easily and satisfactorily as its contents are poured out and are reduced in their volume.

The opening 5 can also be disposed in the shell area or even in the bottom of the bottle 1. Furthermore, the opening 5 is not restricted to a structure in which it is disposed on the outer vessel 2. For example, a channel structure can be formed at the mouth of the bottle 1 between the mouth portion of the outer vessel 2 and that of the inner vessel 3. However, with the opening 5 of such a structure, a certain assembly must be secured for the inner vessel 3 and the outer vessel 2 because capping has to be applied to the mouth at the time when the inner vessel 3 is deflated and deformed. This provision makes test operations troublesome.

Figure 1B:
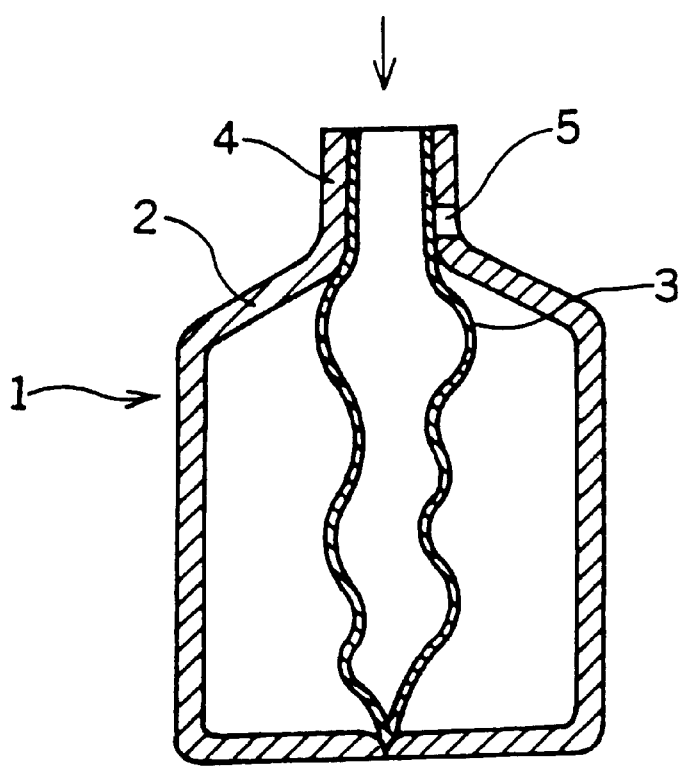

In conducting the leak test of this invention, the opening 5 of the bottle 1 is used to introduce air into the space between the outer vessel 2 and the inner vessel 3, or air inside the inner vessel 3 is suctioned from the mouth 4, as shown in FIG. 1-a. As a result, the inner vessel 3 is peeled from the outer vessel 2, and is put in a state in which it is deflated to some extent, as shown in FIG. 1-b.

The leak test is then conducted by supplying air into the inner vessel 3 at a given micropressure. In order for smooth swelling of the inner vessel 3, it is preferred to secure the air channel 10 between the inner vessel 3 and the outer vessel 2. This is achieved by inserting a rod 6 into the opening 5 and pushing the inner vessel 3 so that air in the space between the inner vessel 3 and the outer vessel 2 can be discharged easily to the outside (See FIG. 2).

Figure 2:
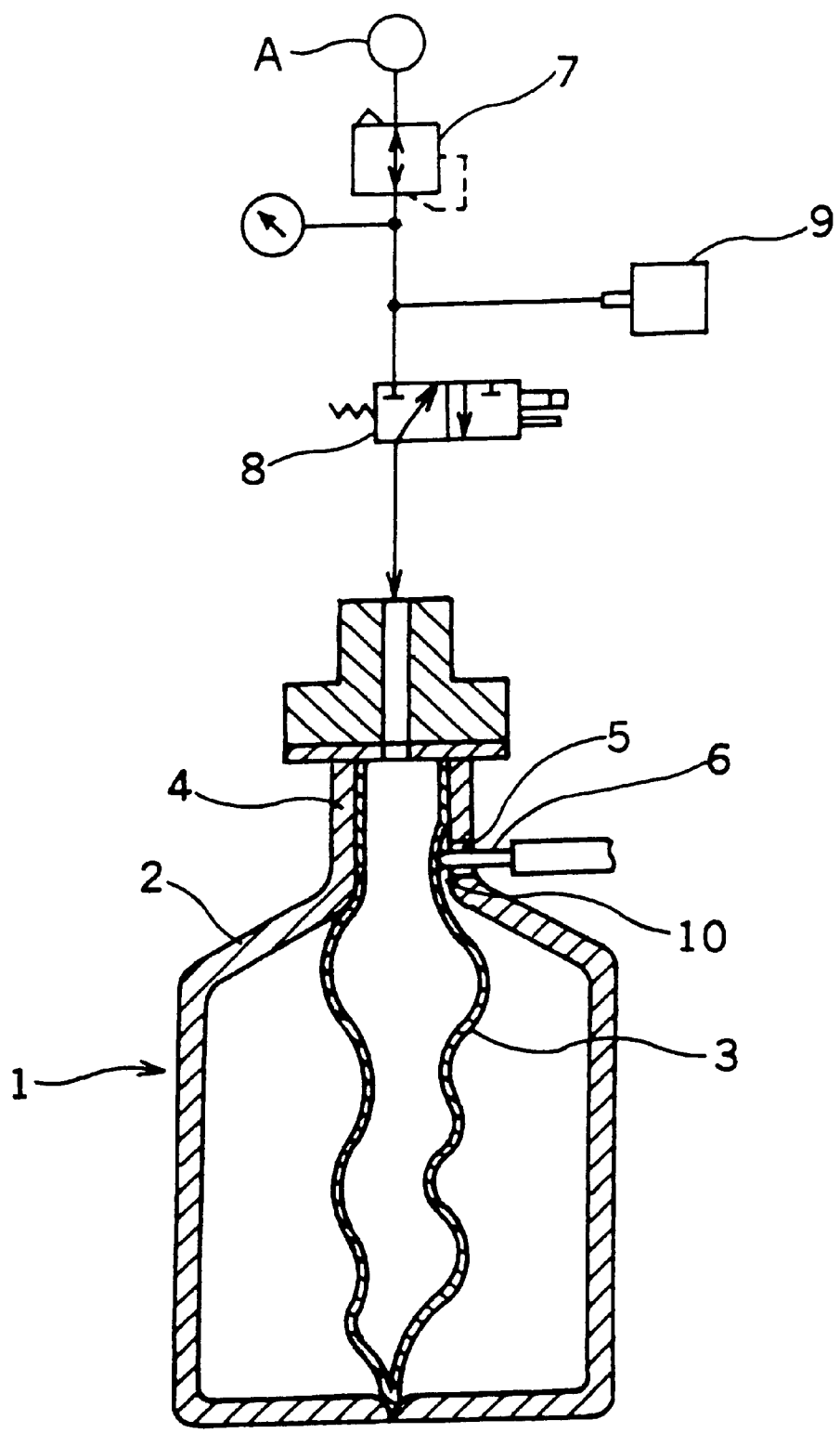
FIG. 2 shows an embodiment of the air pressure circuit for the practice of this invention.

FIG. 2 shows an example of air supply channel for use in the leak test. Air source A is connected to the mouth 4 of the bottle 1 via a pressure-reducing valve 7 and a change-over valve 8. A micropressure switch 9 is connected halfway on the pipe between the pressure-reducing valve 7 and the change-over valve 8.

First of all, a bottle 1 having no leak in the inner vessel 3 is set as a good sample. Air from the air supply source A is set at a supply pressure P by means of the pressure-reducing valve 7 and is blown into the inner vessel 3. Test period (t) and test pressure (p) are determined by measuring the time required for the swelling of the inner vessel 3 to start and the pressure (micropressure) at that time.

The micropressure switch 9 is then set at the test pressure (p) as obtained from the measurement.

The bottle 1 to be tested is set, and air is blown into the inner vessel 3 at a supply pressure P. The reading at the micropressure switch 9 is checked to see whether the test pressure (p) is reached or not within the test period (t).

The inner vessel 3 is judged to have no leak if the test pressure (p) has been reached within the test period (t). It is judged to have a leak if the test pressure (p) has not been reached within the set period.

The walls of the outer and inner vessels 2 and 3 are not restricted to a single-layer structure. Rather, it is advantageous that the outer vessel 2 and/or the inner vessel 3 has a laminated structure under such conditions as to secure peelability between these two vessels. With this laminated structure, it is intended to give full play to the functions required for the entire bottle 1 or for each of the outer and inner vessels.

Figure 3:
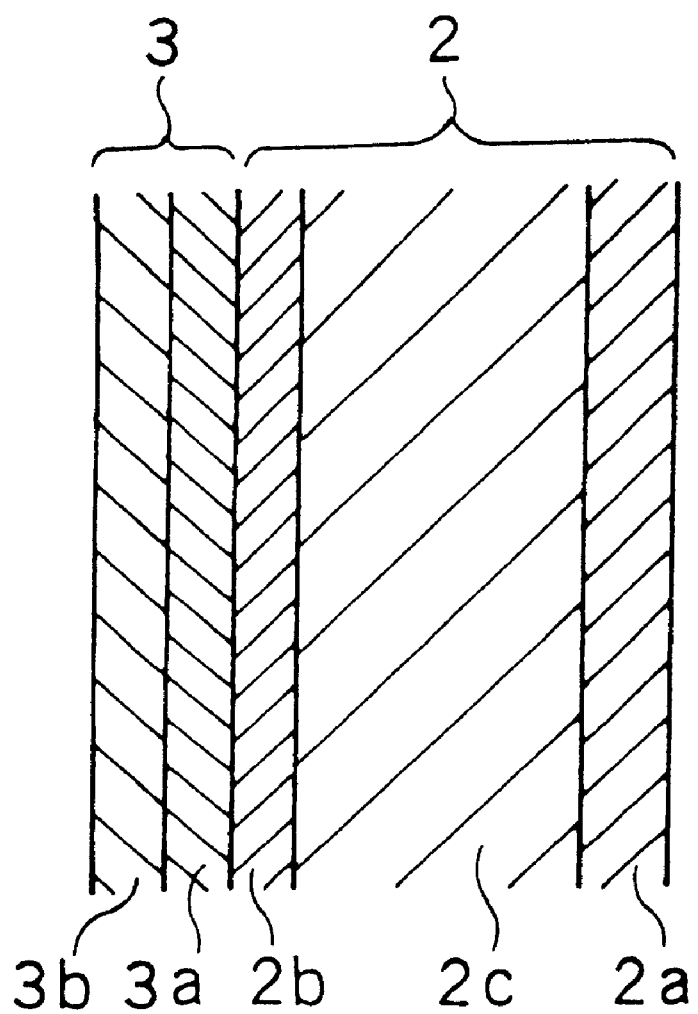
FIG. 3 is an enlarged cross-sectional view showing a section of the wall structure of the bottle with which this invention is carried out.

For example, in the embodiment of FIG. 3, the outer vessel 2 has a three-layer structure comprising the outer layer 2a of a high density polyethylene resin which is easy to undergo surface treatments, such as printing, hot stamping, or mixing with pearling materials; a middle layer 2c of a recycled resin material; and an inner layer 2b of a high density polyethylene resin which is highly peelable from the inner vessel 3. The inner vessel 3 has a two-layer structure comprising an outer layer 3a of nylon which is highly peelable from the inner layer 2b of the outer vessel 2; and an inner layer 3b of an adhesive low density polyethylene resin which is highly durable against the liquid contents.

In the embodiment of FIG. 3, the inner layer 2b of the outer vessel 2 is made of a high density polyethylene resin, while the outer layer 3a of the inner vessel 3 is made of nylon, so that excellent peelability can be obtained between the outer vessel 2 and the inner vessel 3. Simple and effective resources saving can be achieved because recycled resin materials can be utilized for molding most of the outer vessel 2. The inner vessel 3 is highly durable against the liquid contents, and yet it is fully flexible and is able to have full mechanical strength against rupture.

The bottle 1 can be given a desirable glossy appearance by using a polyethylene terephthalate resin for the outer layer 2a and the inner layer 2b of the outer vessel 2. In that case, high peelability is given between the outer vessel 2 and the inner vessel 3 by using a low density polyethylene resin for molding the outer layer 3a of the inner vessel 3.

The bottle 1 can be further given a lightproofing property by adding a shading material to at least one of the outer layer 3a of the inner vessel 3, the inner layer 3b of the inner vessel 3, and the inner layer 2b of the outer vessel 2.

EXAMPLE 1

Double blow molded bottles of a round shape having a capacity of 350 ml were used in the test. A sample bottle with the inner vessel 3 having no leak was set, and air was blown into the inner vessel 3 at an air supply pressure of 1.5 KP (0.015 Kgf/cm$^2$). The inner vessel 3 started to swell at a pressure of 0.05 KP after about 0.2 sec.

A test period (t) was set at 0.5 sec, and a test pressure (p) at 0.07 KP. A leak test was conducted at an air supply pressure of 1.5 KP, using a bottle 1 with the inner vessel 3 having a leak of 0.3 mm in diameter. The pressure inside the inner vessel 3 did not reach 0.07 KP after lapsed time of 0.5 sec.

Tests were made with other bottles 1 with the inner vessel 3 having no leak. The pressure inside the inner vessel 3 reached at 0.07 PK or higher in 0.5 sec in all the bottles tested.

Thus, in the case of double blow molded bottles used as the test samples, the inner vessels 3 with no leak and those with a leak of 0.3 mm or larger in diameter could have been detected and distinguished by setting an air supply pressure of 1.5 KP, a test period of 0.5 sec, and a test pressure of 0.07 KP.

The preferred embodiments of this invention have been described above. Their effectiveness is summarized as follows:

It is possible to detect a leak in the inner vessel simply by supplying air at a preset micropressure to the inner vessel which has been peeled from the outer vessel and measuring the pressure inside the inner vessel to see whether a given pressure is reached or not within a certain preset period of time. In this manner, the leak tests with the inner vessel of double blow molded bottles, which have been conventionally impossible, can be conducted easily, steadily, and speedily.

Now that the inner vessels can be tested for any leak, it is possible to provide stably the double blow molded bottles with the inner vessel having no leak, and thereby to improve outstandingly the quality of products utilizing double blow molded bottles.

In the invention, it has become possible for the inner vessel to be deflated and deformed without utilizing any other parts. As a result, test operation has become simple, and the tests can be conducted speedily and effectively.

In the invention, there is provided a laminated structure for at least one of the outer vessel and the inner vessel, and peelability between the outer vessel and the inner vessel can be set at any desired level, apart from the mechanical strength or appearance of the outer vessel and the ability of the inner vessel to protect its contents. Thus, the leak tests with high precision can be conducted steadily and stably.

We claim:

1. A method of testing for a leak within an inner vessel (3) of a double blow molded bottle (1), wherein said bottle (1) comprises an outer vessel (2) of a synthetic resin or resins forming the outer shell of a fixed shape and said inner vessel (3) in the form of an inner bag of a flexible synthetic resin or resins, said inner vessel being peelably laminated inside said outer vessel (2), and wherein said bottle (1) has an opening to enable the space between said outer vessel (2) and said inner vessel (3) to be exposed to the outside; said method comprising forming an air channel (10) between said outer vessel (2) and said inner vessel (3) by deflating and peeling said inner vessel (3) from said outer vessel (2) and by securing air flow through an opening (5) of said air channel (10), and judging the existence or non-existence of a leak through the wall of said inner vessel (3) by supplying air to said inner vessel (3) at a given micropressure and by observing, after a certain period of elapsed time, whether or not the pressure inside said inner vessel (3) reaches a predetermined level which has been set from a test conducted under the same conditions using bottles with no leak through the wall of said inner vessel (3).

2. The method of testing for a leak within an inner vessel of a double blow molded bottle, according to claim 1, wherein said bottle is of a structure in which said opening (5) is drilled through the wall of said outer vessel (2).

3. The method of testing for a leak within an inner vessel of a double blow molded bottle, according to claim 1, wherein there is provided a laminated structure for at least one of the outer vessel (2) and the inner vessel (3), and wherein the layer comprising the interface between said laminated vessel and the other vessel is given high peelability against the opposite layer.

4. The method of testing for a leak within an inner vessel of a double blow molded bottle, according to claim 2, wherein there is provided a laminated structure for at least one of the outer vessel and the inner vessel, and wherein the layer comprising the interface between said laminated vessel and the other vessel is given high peelability against the opposite layer.

* * * * *